(12) United States Patent
Kikuchi et al.

(10) Patent No.: US 9,562,167 B2
(45) Date of Patent: Feb. 7, 2017

(54) MAGNETIC RECORDING MEDIUM AND MAGNETIC COATING COMPOSITION FOR MAGNETIC RECORDING MEDIUM

(71) Applicant: FUJIFILM Corporation, Minato-ku, Tokyo (JP)

(72) Inventors: Wataru Kikuchi, Minami-ashigara (JP); Toshihide Aoshima, Minami-ashigara (JP); Kazutoshi Katayama, Minami-ashigara (JP); Tatsuo Mikami, Minami-ashigara (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 14/673,205

(22) Filed: Mar. 30, 2015

(65) Prior Publication Data

US 2015/0279403 A1    Oct. 1, 2015

(30) Foreign Application Priority Data

Mar. 31, 2014   (JP) ................................. 2014-074681

(51) Int. Cl.

| | |
|---|---|
| G11B 5/708 | (2006.01) |
| C09D 127/06 | (2006.01) |
| G11B 5/70 | (2006.01) |
| G11B 5/714 | (2006.01) |
| C08G 18/79 | (2006.01) |
| C08G 18/42 | (2006.01) |

(52) U.S. Cl.
CPC ......... *C09D 127/06* (2013.01); *C08G 18/4269* (2013.01); *C08G 18/791* (2013.01); *G11B 5/7013* (2013.01); *G11B 5/714* (2013.01)

(58) Field of Classification Search
None
See application file for complete search history.

(56) References Cited

U.S. PATENT DOCUMENTS

| | | | |
|---|---|---|---|
| 2007/0111037 A1* | 5/2007 | Economy | C08G 63/16 428/835.6 |
| 2009/0085002 A1 | 4/2009 | Omura et al. | |
| 2010/0247972 A1* | 9/2010 | Aritoshi | G11B 5/7013 428/838 |
| 2012/0231297 A1* | 9/2012 | Sugiura | C07C 43/23 428/810 |

FOREIGN PATENT DOCUMENTS

| | | |
|---|---|---|
| JP | 08-045058 A | 2/1996 |
| JP | 2004-067941 A | 3/2004 |
| JP | 2009-088293 A | 4/2009 |

OTHER PUBLICATIONS

Office Action dated Mar. 15, 2016 in corresponding Japanese Application No. 2014-074681.

* cited by examiner

*Primary Examiner* — Holly Rickman
*Assistant Examiner* — Linda Chau
(74) *Attorney, Agent, or Firm* — Sughrue Mion, PLLC

(57) ABSTRACT

An aspect of the present invention relates to a magnetic recording medium, which comprises a magnetic layer comprising ferromagnetic powder and binder on a nonmagnetic support, wherein the magnetic layer further comprises a compound which has a weight average molecular weight of equal to or more than 1,000 but less than 20,000 and is denoted by formula (1):

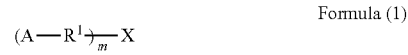

Formula (1)

wherein, in formula (1), A denotes a monovalent substituent, $R^1$ denotes a single bond or a divalent connecting group, and m denotes an integer ranging from 2 to 4, multiple instances of A and $R^1$ that are present can be identical or different, at least one of the multiple instances of A that are present denotes a monovalent polymer group and X denotes a heterocyclic group of valence m.

13 Claims, No Drawings

MAGNETIC RECORDING MEDIUM AND MAGNETIC COATING COMPOSITION FOR MAGNETIC RECORDING MEDIUM

CROSS-REFERENCE TO RELATED APPLICATIONS

This application claims priority under 35 U.S.C. 119 to Japanese Patent Application No. 2014-074681 filed on Mar. 31, 2014. The above application is hereby expressly incorporated by reference, in its entirety.

BACKGROUND OF THE INVENTION

Field of the Invention

The present invention relates to a magnetic recording medium and a magnetic coating composition for a magnetic recording medium.

Discussion of the Background

Particulate magnetic recording media (also referred to as simply "magnetic recording media" hereinafter) are normally fabricated by coating a magnetic coating composition comprising ferromagnetic powder and binder on a nonmagnetic support, either directly or indirectly via another layer such as a nonmagnetic layer, and conducting a curing treatment such as heating or irradiation with light as needed to form a magnetic layer.

Conventionally, binders have played an important role in enhancing the dispersion of ferromagnetic powder and the durability of the magnetic layer in particulate magnetic recording media. As a result, various research has been conducted on binders (for an example, see Japanese Unexamined Patent Publication (KOKAI) No. 2004-67941, which is expressly incorporated herein by reference in its entirety).

As stated in Japanese Unexamined Patent Publication (KOKAI) No. 2004-67941, polar groups such as sulfonate groups have been incorporated into binder to enhance the dispersion of ferromagnetic powder. The introduction of polar groups into binder has been conducted to increase dispersion by causing the binder to effectively adsorb to the surface of ferromagnetic powder. However, as is described in paragraph 0026 of Japanese Unexamined Patent Publication (KOKAI) No. 2004-67941, the introduction of an excessive quantity of polar groups tends to decrease the dispersion of ferromagnetic powder. Accordingly, it has proven difficult to achieve an adequate improvement in the dispersion of ferromagnetic powder by introducing polar groups into binder.

The use of resins with good mechanical properties as binder in the magnetic layer has been examined to enhance the durability of the magnetic layer. In this regard, Japanese Unexamined Patent Publication (KOKAI) No. 2004-67941 proposes using a prescribed copolymerization component such as an aromatic polyisocyanate to increase the concentration of urethane groups in order to enhance the mechanical properties of the polyurethane resin that is used as binder in the magnetic layer. As stated in paragraph 0025 of Japanese Unexamined Patent Publication (KOKAI) No. 2004-67941, the higher the concentration of urethane groups of the resin that is used as binder, the better the mechanical properties that can be achieved in the resin. However, solubility decreases. As a result, dispersion of the ferromagnetic powder tends to decrease. Thus, Japanese Unexamined Patent Publication (KOKAI) No. 2004-67941 states in paragraph 0025 that the concentration of urethane groups is to be in a range that permits good dispersion of ferromagnetic powder.

Even greater durability has been required of the magnetic layer in recent years. Reasons for this include the fact that the market has demanded ever higher properties and the size of ferromagnetic powder has been decreasing. For example, properties required by the market in recent years have included high durability in continuous running over longer periods with higher reliability than in the past. Since the magnetic force per bit has weakened accompanying the reduction in particle size of ferromagnetic powder, the distance between the reproduction head and the surface of the magnetic recording medium (magnetic layer) has tended to decrease in order to read information from such bits. Thus, the frequency of contact between the reproduction head and the surface of the magnetic recording medium (magnetic layer) has increased in recent years. Accordingly, magnetic recording media have come to be used in states where the surface of the magnetic layer is more prone to being scratched than in the past.

Accordingly, it is conceivable to enhance the mechanical properties of the resin that is employed as binder in the magnetic layer, as has been examined in the past, to increase the durability of the magnetic layer. However, as set forth above, the better the mechanical properties of the binder are rendered to enhance the durability of the magnetic layer, the poorer the dispersion property of the ferromagnetic powder tends to be. That is, achieving both the greater durability of the magnetic layer that has been demanded in recent years along with better dispersion of ferromagnetic powder will be difficult with binders such as those that have been conventionally employed.

SUMMARY OF THE INVENTION

Accordingly, an aspect of the present invention provides for a new means for achieving greater dispersion of ferromagnetic powder and greater durability of the magnetic layer in magnetic recording media.

The present inventors conducted extensive research to achieve the above-stated object. As a result, they discovered that by employing a compound denoted by formula (1) below and having a weight average molecular weight of equal to or more than 1,000 but less than 20,000 together with ferromagnetic powder and binder as magnetic layer components, it was possible to achieve improved dispersion of ferromagnetic powder and enhanced durability of the magnetic layer.

Formula (1)

(In formula (1), A denotes a monovalent substituent, $R^1$ denotes a single bond or a divalent connecting group, and m denotes an integer ranging from 2 to 4. The multiple instances of A and $R^1$ that are present can be identical or different. At least one of the multiple instances of A that are present denotes a monovalent polymer group and X denotes a heterocyclic group of valence m.)

The following is conjecture by the present inventors and is not to be construed as limiting the present invention in any way. The present inventors believe that the fact that the above compound combines a heterocyclic group (X in formula (1)) that is capable of adsorbing to the surface of the ferromagnetic powder and a polymer group A (with a structure capable of functioning as a steric repulsion group) contributes to enhancing dispersion of the ferromagnetic powder. More specifically, the facts that the hetero ring effectively adheres to the surface of the particles of ferromagnetic powder and that the presence of A prevents the aggregation of particles are thought to be why it is possible to improve dispersion of the ferromagnetic powder by means of the above compound.

As regards durability of the magnetic layer, since the above compound is not a compound of higher molecular weight than the resin that is used as binder, it is thought to function as a plasticizer in the magnetic layer. More particularly, when the strength of the magnetic layer is simply increased, the magnetic layer is thought to become brittle and tend to rupture. However, when the above compound serves as a plasticizer, it imparts a suitable degree of ready extensibility to the magnetic layer, which the present inventors presume contributes to enhancing the durability of the magnetic layer.

The present invention was devised based on the above discoveries.

An aspect of the present invention relates to a magnetic recording medium having a magnetic layer comprising ferromagnetic powder and binder on a nonmagnetic support, wherein the magnetic layer further comprises a compound denoted by formula (1) above having a weight average molecular weight of equal to or more than 1,000 but less than 20,000.

A further aspect of the present invention relates to a magnetic coating composition for magnetic recording media comprising:
a compound denoted by formula (1) above and having a weight average molecular weight of equal to or more than 1,000 but less than 20,000;
ferromagnetic powder;
binder; and
solvent.

In one embodiment, the binder has a weight average molecular ranging from 20,000 to 120,000.

In one embodiment, the heterocyclic group denoted by X in formula (1) comprises a hetero ring selected from the group consisting of isocyanurate rings and triazine rings.

In one embodiment, the monovalent polymer group denoted by A in formula (1) has a polyester structure.

In one embodiment, one or more of the multiple instances of A that are present in formula (1) is a monovalent acid group.

In one embodiment, the monovalent acid group is a carboxyl group or a carboxyl salt group.

In one embodiment, the ferromagnetic powder has an average particle size of 10 nm or more and but not more than 50 nm.

In one embodiment, the above compound is incorporated in a proportion of 0.5 to 50 weight parts per 100 weight parts of ferromagnetic powder.

In one embodiment, the binder is selected from the group consisting of polyurethane resins and vinyl chloride resins.

In one embodiment, the magnetic coating composition for magnetic recording media comprises a solvent in the form of a ketone solvent.

An aspect of the present invention can make it possible to achieve both improved dispersion of ferromagnetic powder and enhanced durability of the magnetic layer.

Other exemplary embodiments and advantages of the present invention may be ascertained by reviewing the present disclosure.

DETAILED DESCRIPTION OF THE EMBODIMENTS

Unless otherwise stated, a reference to a compound or component includes the compound or component by itself, as well as in combination with other compounds or components, such as mixtures of compounds.

As used herein, the singular forms "a," "an," and "the" include the plural reference unless the context clearly dictates otherwise.

Except where otherwise indicated, all numbers expressing quantities of ingredients, reaction conditions, and so forth used in the specification and claims are to be understood as being modified in all instances by the term "about." Accordingly, unless indicated to the contrary, the numerical parameters set forth in the following specification and attached claims are approximations that may vary depending upon the desired properties sought to be obtained by the present invention. At the very least, and not to be considered as an attempt to limit the application of the doctrine of equivalents to the scope of the claims, each numerical parameter should be construed in light of the number of significant digits and ordinary rounding conventions.

Additionally, the recitation of numerical ranges within this specification is considered to be a disclosure of all numerical values and ranges within that range. For example, if a range is from about 1 to about 50, it is deemed to include, for example, 1, 7, 34, 46.1, 23.7, or any other value or range within the range.

The following preferred specific embodiments are, therefore, to be construed as merely illustrative, and non-limiting to the remainder of the disclosure in any way whatsoever. In this regard, no attempt is made to show structural details of the present invention in more detail than is necessary for fundamental understanding of the present invention; the description making apparent to those skilled in the art how several forms of the present invention may be embodied in practice.

The magnetic recording medium according to an aspect of the present invention has a magnetic layer comprising ferromagnetic powder and binder on a nonmagnetic support, and further comprises in the magnetic layer a compound denoted by formula (1) having a weight average molecular weight of equal to or more than 1,000 but less than 20,000.

The compound that is contained in the magnetic layer of the above magnetic recording medium contributes to improving dispersion of the ferromagnetic powder. Further, the magnetic layer containing the above compound exhibits good durability (more specifically, being hard to be scratched and good resistance to scratching).

The magnetic coating composition for magnetic recording media according to an aspect of the present invention comprises a compound denoted by formula (1) having a weight average molecular weight of equal to or more than 1,000 but less than 20,000, ferromagnetic powder, binder, and solvent.

The magnetic coating composition for magnetic recording media can be employed as a magnetic layer-forming coating liquid for forming the magnetic layer of the magnetic recording medium according to an aspect of the present invention, or to prepare a magnetic layer-forming coating liquid.

The above magnetic recording medium and magnetic coating composition for magnetic recording media (also referred to hereinafter as the "composition") will be described in greater detail below. In the present invention, the word "to" denotes a range including the preceding and succeeding numeric values as minimum and maximum values, respectively.

<Compound Denoted by Formula (1) Having a Weight Average Molecular Weight of Equal to or More than 1,000 but Less than 20,000>
(Details of Formula (1))
Formula (1) is as follows:

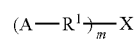

Formula (1)

(In formula (1), A denotes a monovalent substituent, $R^1$ denotes a single bond or a divalent connecting group, and m denotes an integer ranging from 2 to 4. The multiple instances of A and $R^1$ that are present can be identical or different. At least one of the multiple instances of A that are present denotes a monovalent polymer group and X denotes a heterocyclic group of valence m.)

Formula (1) will be further described below.

In formula (1), A denotes a monovalent substituent. In formula (1), m denotes an integer falling within a range of 2 to 4. In formula (1), there are multiple (m) instances of A. One or more of the multiple instances of A that are present denotes a monovalent polymer group. Here, the term "monovalent" polymer group refers to a monovalent substituent having a structure consisting of a polymer, formed by the bonding of identical structural units or two or more units of two or more different structures (the term polymer includes both homopolymers and copolymers), from which a terminal group has been removed. Such groups are thought to function as steric repulsion groups. The present inventors believe this to be due to such groups inhibiting the aggregation of particles of ferromagnetic powder, contributing to enhanced dispersion of the ferromagnetic powder. The number of structural units contained in the monovalent polymer group is, for example, 2 to 40, desirably 3 to 35, and preferably, 5 to 30. In formula (1), when multiple monovalent polymer groups are present, the multiple polymer groups can be identical or different. In formula (1), it is also possible for all of the multiple instances of A that are present to be monovalent polymer groups.

The monovalent polymer group denoted by A can be a monovalent substituent obtained by removing a terminal group from a known polymer. It suffices for such a polymer (hereinafter, the term "polymer" will be used to include both polymers (homopolymers) and copolymers) to be a known polymer; there is no specific limitation. Examples of desirable polymers are one or more members selected from the group consisting of ester polymers, ether polymers, urethane polymers, polymers and copolymers of vinyl monomers, amide polymers, epoxy polymers, silicone polymers, modified products thereof, and copolymers (for example, comprising polyether/polyurethane copolymers and polyether/vinyl monomer polymers and copolymers (which can be any form among random copolymers, block copolymers, or graft copolymers)). One or more members selected from the group consisting of ester polymers, ether polymers, urethane polymers, and polymers and copolymers of vinyl monomers, modified products thereof, and copolymers thereof are preferred. Ester polymers are of greater preference. That is, the monovalent polymer group denoted by A in formula (1) desirably has a polyester structure comprising two or more structural units containing ester structures.

As a polyester structure, a structural unit containing an ester bond can contain a combination of one or more linear, branched, or alicyclic hydrocarbon groups and aromatic hydrocarbon groups. A more particular example is a polyester structure in the form of a structure obtained by removing a terminal group such as a hydrogen atom from a polyester comprising an aromatic hydrocarbon group in a structural unit containing an ester bond, such as polyethylene naphthalate, polyethylene terephthalate, or the residue of a polyester comprising a linear hydrocarbon group in a structural unit comprising an ester bond, obtained by the ring-opening polymerization of a lactone compound. Examples of the lactone compound are: ∈-caprolactone, δ-caprolactone, β-propiolactone, γ-butyrolactone, δ-valerolactone, γ-valerolactone, enantholactone, β-butyrolactone, γ-hexanolactone, γ-ocatonlactone, δ-hexalanolactone, δ-octanolactone, δ-dodecanolactone, α-methyl-γ-butyrolactone, and lactides. From the perspectives of reactivity and availability, ∈-caprolactone, lactides, and δ-valerolactone are desirable. However, there is no limit thereto. Any lactone compound that will yield a polyester by ring-opening polymerization can be used.

When a monovalent substituent other than a polymer group is contained as A in formula (1), the monovalent substituent is not specifically limited. Specific examples of monovalent substituents are alkyl groups (such as alkyl groups having 1 to 6 carbon atoms), hydroxyl groups, alkoxy groups (such as alkoxy groups having 1 to 6 carbon atoms), halogen atoms (such as fluorine atoms, chlorine atoms, and bromine atoms), cyano groups, amino groups, nitro groups, acyl groups, carboxyl groups, sulfonic acid groups, phosphoric acid groups, and salts thereof.

In one embodiment, one or more monovalent acid groups are desirably contained as A. Here, the term "acid group" refers to a group that is capable of releasing $H^+$ in water or a solvent containing water (an aqueous solvent) and dissociating into an anion. Examples are carboxyl groups, sulfonic acid groups, phosphoric acid groups, and salt forms thereof. From the perspective of further enhancing dispersion, carboxyl groups, sulfonic acid groups, phosphoric acid groups, and salt forms thereof are desirable. Here the term "salt form" of a carboxyl group (—COOH) means a carboxyl salt group denoted by —COOM wherein M denotes a cation such as an alkali metal ion. The same applies to the other acid groups given by way of example above. Preferably, the acid group is a carboxyl group or a carboxyl salt group.

In formula (1), $R^1$ denotes a single bond or a divalent connecting group. In formula (1), since m denotes an integer ranging from 2 to 4, multiple (m) instances of $R^1$ are present in the compound denoted by formula (1). The multiple instances of $R^1$ that are contained can be identical or different. Examples of divalent connecting groups are divalent connecting groups comprised of combinations of one or more members selected from the group consisting of alkylene groups which can have linear, branched, or cyclic structures; alkenylene groups which can have linear, branched, or cyclic structures; —C(=O)—; —O—; —C(=O)—NR— (where R denotes a hydrogen atom or an alkyl group having 1 to 4 carbon atoms); —O—C(=O)—NH—; arylene groups; and halogen atoms. More specific examples are divalent connecting groups comprised of combinations of one or more members selected from the group consisting of alkylene groups having 1 to 12 carbon atoms and which can have linear, branched, or cyclic structures; alkenylene groups having 1 to 6 carbon atoms and which can have linear, branched, or cyclic structures; —C(=O)—;

—O—; —C(=O)—NR— (where R denotes a hydrogen atom or an alkyl group having 1 to 4 carbon atoms); —O—C(=O)—NH—; —S—; phenylene groups; and halogen atoms. Each of the groups listed above can be substituted or unsubstituted. In the present invention, unless specifically stated otherwise, the groups that are described can be substituted or unsubstituted. When a given group comprises one or more substituents, examples of the substituent are alkyl groups (such as alkyl groups having 1 to 6 carbon atoms), hydroxyl groups, alkoxyl groups (such as alkoxyl groups having 1 to 6 carbon atoms), halogen atoms (such as fluorine atoms, chlorine atoms, and bromine atoms), cyano groups, amino groups, nitro groups, acyl groups, iscyanate groups, and carboxyl groups. The "number of carbon atoms" of a group having a substituent means the number of carbon atoms of the portion without the substituent. The divalent connecting group denoted by $R^1$ is desirably a divalent connecting group comprised of from 1 to 10 carbon atoms, from 0 to 10 oxygen atoms, from 0 to 10 halogen atoms, and from 1 to 30 hydrogen atoms. Specific examples are the structures given below. In the structures given below, * denotes the position of a bond with another structure. However, the present invention is not limited to the specific examples given below.

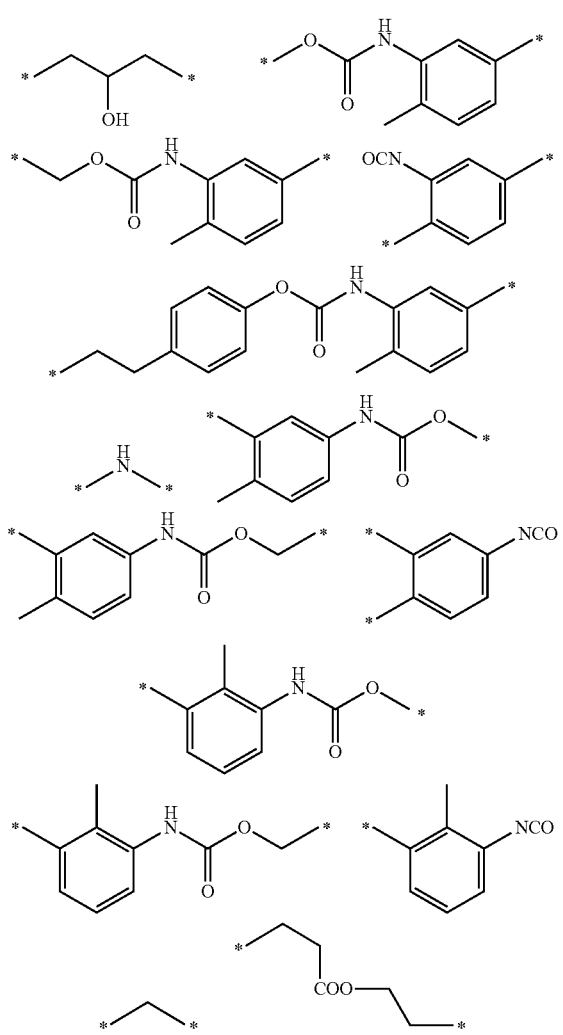

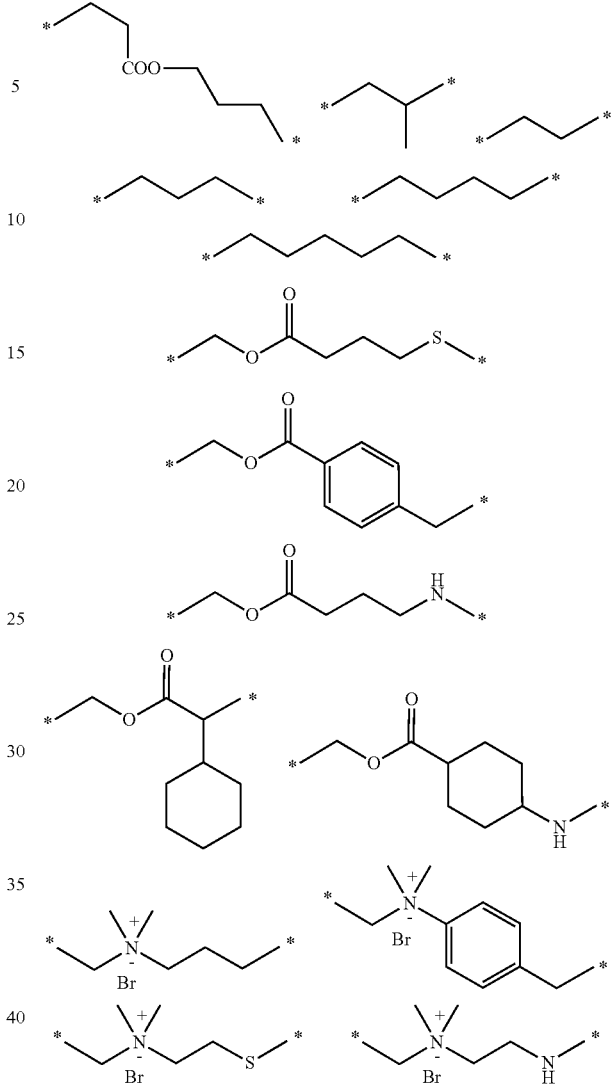

In formula (1), m denotes an integer ranging from 2 to 4, desirably 2 or 3.

In formula (1), X denotes a connecting group of valence m. m is as set forth above.

The compound denoted by formula (1) comprises a heterocyclic group of valence m. As stated above, the present inventors presume that incorporating an X of this type contributes to adsorption of the compound denoted by formula (1) to the surface of the ferromagnetic powder, enhancing dispersion. Examples of the heterocyclic group are hetero rings comprising one or more hetero atoms in the form of nitrogen atoms, oxygen atoms, and sulfur atoms. The hetero ring can be an aromatic ring or a nonaromatic ring. It can also be a single ring or a condensed ring.

The heterocyclic group desirably comprises one or more hetero atoms constituting the hetero ring in the form of nitrogen atoms. Examples of nitrogen-containing hetero rings are the nitrogen-containing hetero rings given by way of example below. Of these, desirable examples are isocyanurate rings, triazine rings, and purine rings, and preferred examples are isocyanurate rings and triazine rings.

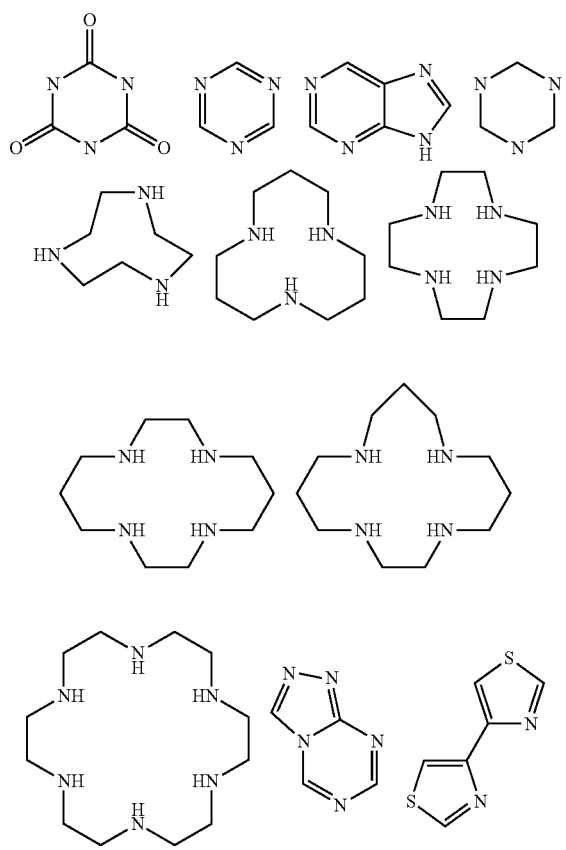

(Weight Average Molecular Weight)

The above compound is denoted by formula (1) and has a weight average molecular weight of not less than 1,000 but less than 20,000. The present inventors presume that since the above compound has a lower molecular weight than the binders that are commonly employed in the magnetic layer, it plays a role as a plasticizer. Because of this, the weight average molecular weight of the above compound is preferably not more than 9,000. Since the compound denoted by formula (1) contains above-described A, it has a molecular weight that is greater than that of common low-molecular-weight compounds. Because of this, the weight average molecular weight of the compound denoted by formula (1) is not less than 1,000, desirably not less than 1,500, and preferably not less than 2,000. The weight average molecular weight referred to in the present invention is a value obtained by measurement by gel permeation chromatography (GPC) and conversion based on the standard polystyrene.

Specific examples of the above compound are the compounds given by way of example below and the various compounds given by way of example in the embodiments farther below. In the exemplary compounds the multiple partial structures of which are denoted by R, R is either comprised of these multiple partial structures or is a polymer group containing these multiple partial structures.

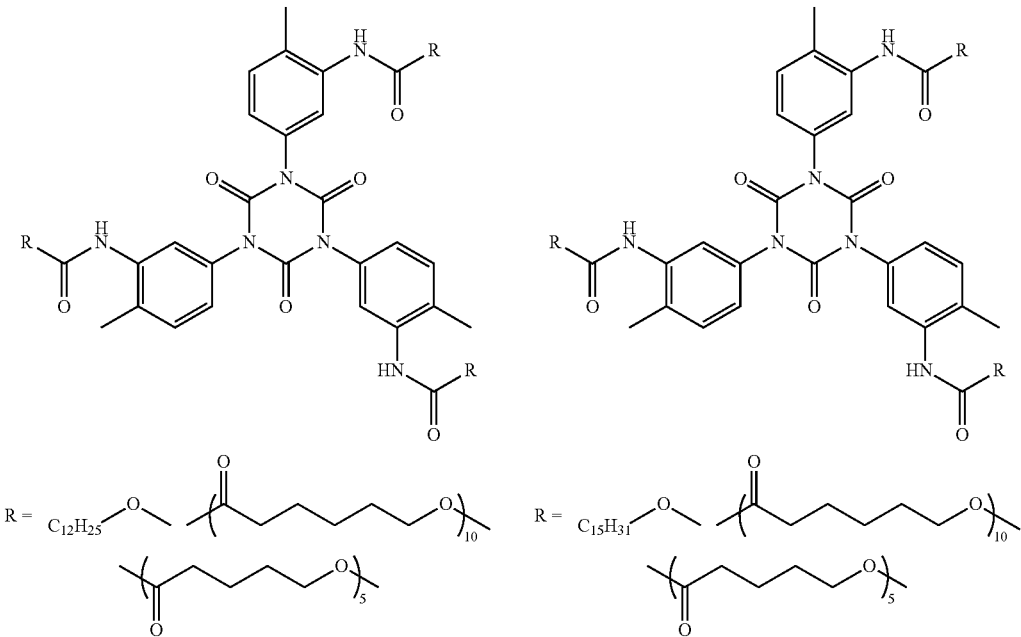

11
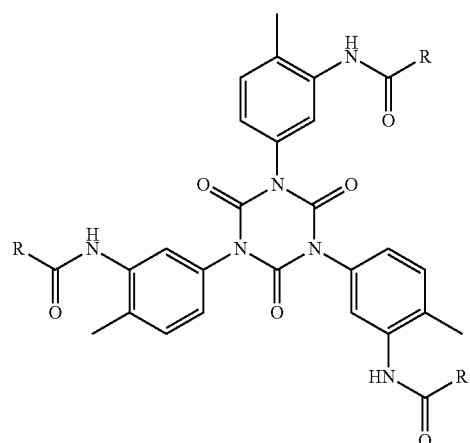
R = 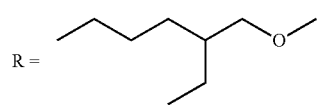
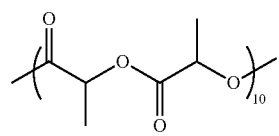
12
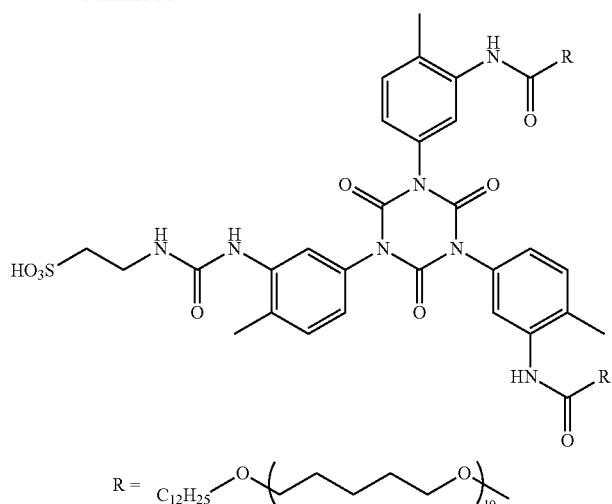
R = 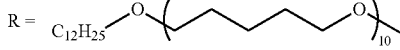
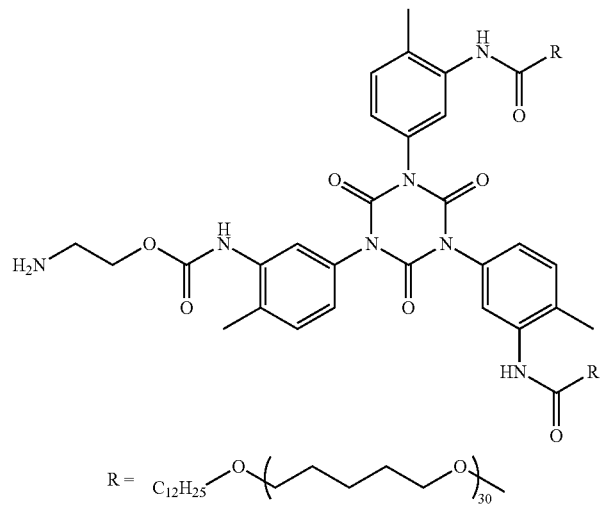
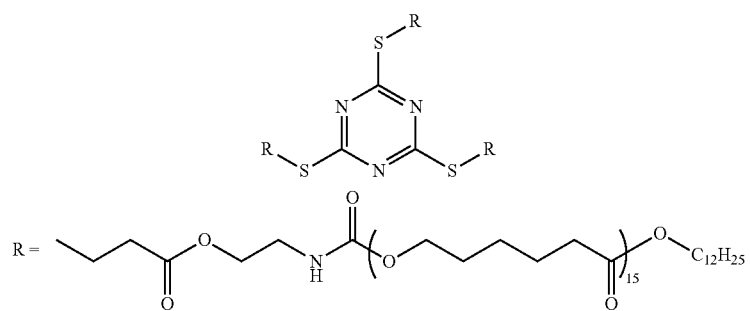

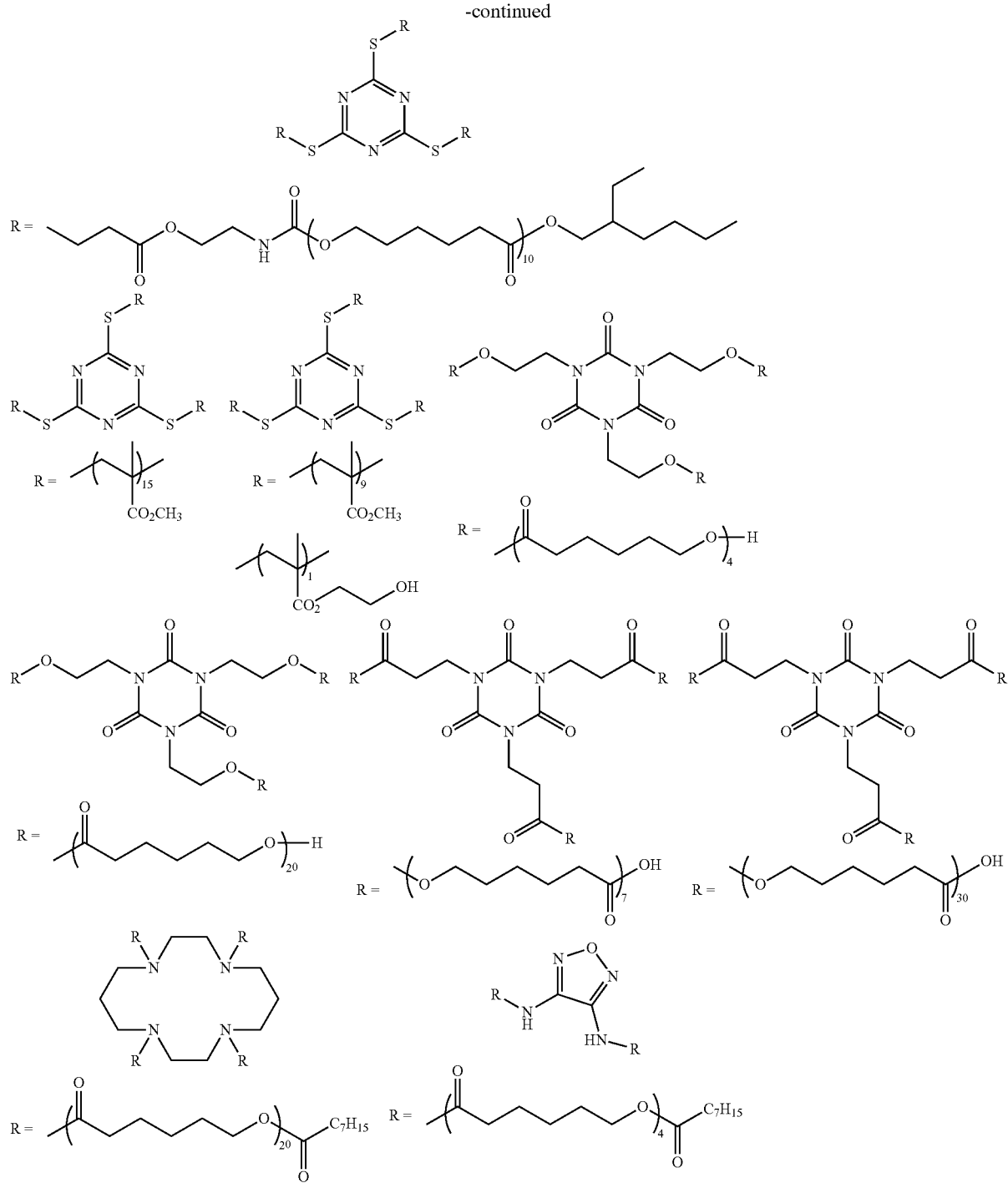

Synthesis Methods

The compound set forth above can be synthesized by known methods. An example of a synthesis method is: a method of obtaining an adduct comprising A by means of the addition reaction or condensation reaction of a polymer providing A and a multifunctional compound substituted with two or more reactive groups such as isocyanate groups, epoxy groups, and amino groups, as well as a mother nucleus structure providing X (described as the "mother nucleus compound" hereinafter).

Alternatively, after introducing by a known method any reactive group such as an isocyanate group or epoxy group into the above adduct, it can be reacted with a compound for incorporating an acid group in the form of the compound having an acid group and a functional group (such as a hydroxyl group or carboxyl group) that is capable of reacting with the above reactive group to obtain a compound having one or more instances of A in the form of a monovalent acid group.

Examples of the above mother nucleus compound are various compounds comprising partial structures in the form of hetero rings containing X set forth above along with two or more reactive groups. Specific examples are the compounds employed in the Examples described farther below, but there is no limitation thereto.

The polymer that is subjected to an addition reaction with the mother nucleus compound is as set forth in the description of A above. The polymer desirably has a weight average molecular weight of not less than 1,000 but less than 20,000, preferably a weight average molecular weight falling within a range of 1,200 to 12,000, and more preferably, one falling within a range of 1,500 to 9,000.

The addition reaction of the mother nucleus compound and the polymer can be conducted by stirring and mixing the mother nucleus compound and the polymer in the presence of any organic solvent. The addition reaction can also be conducted without solvent. For example, the above addition reaction can be conducted by heating (to a heating temperature of 50 to 200° C., for example) a reaction solution containing the mother nucleus compound and the polymer with stirring in an air or nitrogen atmosphere, or by heating (to a heating temperature of 40 to 150° C., for example) them while adding a catalyst such as an organic tin compound such as stannous octoate, an ammonium salt such as trimethyl ammonium bromide, or a tertiary or quaternary ammonium salt such as benzyldimethylamine. Examples of organic solvents are ethyl acetate, chloroform, tetrahydrofuran, methyl ethyl ketone, acetone, acetonitrile, and toluene.

The reaction of the adduct and the acid group-incorporating component (component for incorporating an acid group) can be conducted by stirring and mixing the above adduct and the acid group-incorporating component in the presence of any organic solvent. This reaction can also be conducted without solvent. With regard to the reaction, reference can be made to the description set forth above regarding the adduct reaction of the mother nucleus compound and polymer. Examples of the acid group-incorporating component are hydroxycarboxylic acids and amino acids. Examples of hydroxycarboxylic acids are glycolic acid, lactic acid, tartronic acid, glyceric acid, hydroxybutyric acid, malic acid, tartaric acid, citric acid, isocitric acid, leucic acid, mevalonic acid, ricinoleic acid, 12-hydroxystearic acid, salicylic acid, vanillic acid, syringic acid, mandelic acid, benzilic acid, 3-(4-hydroxyphenyl)propionic acid, cumaric acid, ferulic acid, and sinapic acid. Examples of amino acids are glycine, analine, aspartic acid, glutamic acid, isoleucine, leucine, methionine, and phenylalanine. Additional examples are sulfonic acids such as taurine, From the perspectives of solubility during reaction and availability, glycolic acid, lactic acid, malic acid, tartaric acid, citric acid, salicylic acid, 3-(4-hydroxyphenyl)propionic acid, and alanine are desirable, and glycolic acid and 3-(4-hydroxyphenyl)propionic acid are preferred.

Following the various above reactions, post-processing such as purification can be conducted as needed.

The above synthesis method is but an example, and the present invention is not limited in any way thereby. Any known synthesis method permitting the synthesis of the compound denoted by formula (1) and having a weight average molecular weight falling within the stated range can be employed without restriction.

The compound set forth above is contained in the magnetic layer of the above magnetic recording medium along with ferromagnetic powder and binder. In the composition according to an aspect of the present invention, it is contained along with ferromagnetic powder, binder, and solvent. One type, or two more types with different structures, of the above compound can be employed in combination. When employing two or more types in combination, the contents set forth below refer to the combined contents of the compounds being employed in combination. The same applies to the contents of the various components set forth below. The above compound is desirably employed in a content of equal to or more than 0.5 weight parts per 100 weight parts of ferromagnetic powder from the perspective of improving dispersion of the ferromagnetic powder and enhancing the durability of the magnetic layer, and preferably equal to or more than 1 weight part per 100 weight parts of ferromagnetic powder. Additionally, it is desirable to increase the fill rate of ferromagnetic powder in the magnetic layer in order to enhance recording density. To that end, it is desirable to reduce the content of compounds other than ferromagnetic powder. From this perspective, the content of the above compound is desirably equal to or less than 50 weight parts, preferably equal to or less than 40 weight parts, and more preferably equal to or less than 30 weight parts, per 100 weight parts of ferromagnetic powder.

<Binder>

The various resins that are commonly employed as binders in particulate magnetic recording media can be employed without restriction as the binder contained in the composition and magnetic recording medium according to an aspect of the present invention. For example, copolymerized polyurethane resins, polyester resins, polyamide resins, vinyl chloride resins, acrylic resins comprised of copolymerized styrene, acrylonitrile, methyl methacrylate and the like, cellulose resins such as nitrocellulose, epoxy resins, phenoxy resins, polyvinyl acetal, polyvinyl butyral, and other polyvinyl alkyral resins can be employed singly or as mixtures of two or more resins. Of these, desirable resins are polyurethane resin, acrylic resins, cellulose resins, and vinyl chloride resins. Preferred resins are polyurethane resins and vinyl chloride resins. These resins can also be employed as binders in the nonmagnetic layer, described farther below.

Reference can be made to Japanese Unexamined Patent Publication (KOKAI) No. 2010-24113, paragraphs 0028 to 0031, with regard to the above binders. The content of binder, for example, falls within a range of 5 to 50 weight parts, desirably within a range of 10 to 30 weight parts, per 100 weight parts of ferromagnetic powder.

The compounds set forth above have a lower molecular weight (a weight average molecular weight falling within a range of 1,000 to 20,000) than the resins that are commonly employed as binders. The present inventors presume that such compounds contribute to enhancing the durability of the magnetic layer by playing a role as plasticizers in the bonder. The weight average molecular weight in combination with the compound set forth above desirably falls within a range of 20,000 to 120,000, preferably within a range of 30,000 to 100,000, and more preferably, within a range of 30,000 to 60,000.

(Ferromagnetic Powder)

The ferromagnetic powder desirably has an average particle size of equal to or less than 50 nm. Ferromagnetic powder having an average particle size of equal to or less than 50 nm is capable of responding to the high density recording that has been required in recent years. Achieving a high degree of dispersion is not an easy task. By contrast, employing the above compound in combination makes it possible to improve dispersion of ferromagnetic powder having an average particle size of equal to or less than 50 nm. From the perspective of the stability of magnetization, the average particle size is desirably equal to or more than 10 nm, preferably equal to or more than 20 nm.

Ferromagnetic powder is photographed at a magnification of 100,000-fold with a transmission electron microscope, and the photograph is printed on print paper at a total magnification of 500,000-fold to obtain a photograph of the particles constituting the ferromagnetic powder. A target particle is selected from the photograph of particles that has been obtained, the contour of the particle is traced with a digitizer, and the size of the (primary) particle is measured. The term "primary particle" refers to an unaggregated, independent particle.

The above measurement is conducted on 500 randomly extracted particles. The arithmetic average of the particle size of the 500 particles obtained in this manner is adopted as the average particle size of the ferromagnetic powder. A Model H-9000 transmission electron microscope made by Hitachi can be employed as the above transmission electron microscope, for example. The particle size can be measured with known image analysis software, such as KS-400 image analysis software from Carl Zeiss.

In the present invention, the average particle size of the powder is the average particle size as obtained by the above method. The average particle size indicated in Examples further below was obtained using a Model H-9000 transmission electron microscope made by Hitachi and KS-400 image analysis software made by Carl Zeiss.

The method described in paragraph 0015 of Japanese Unexamined Patent Publication (KOKAI) No. 2011-048878, which is expressly incorporated herein by reference in its entirety, for example, can be employed as the method of collecting sample powder such as ferromagnetic powder from a magnetic layer for particle size measurement.

In the present invention, the size of the particles constituting powder such as ferromagnetic powder (referred to as the "particle size", hereinafter) is denoted as follows based on the shape of the particles observed in the above particle photograph:

(1) When acicular, spindle-shaped, or columnar (with the height being greater than the maximum diameter of the bottom surface) in shape, the particle size is denoted as the length of the major axis constituting the particle, that is, the major axis length.
(2) When platelike or columnar (with the thickness or height being smaller than the maximum diameter of the plate surface or bottom surface) in shape, the particle size is denoted as the maximum diameter of the plate surface or bottom surface.
(3) When spherical, polyhedral, of unspecific shape, or the like, and the major axis constituting the particle cannot be specified from the shape, the particle size is denoted as the diameter of an equivalent circle. The term "diameter of an equivalent circle" means that obtained by the circle projection method.

The "average acicular ratio" of a powder refers to the arithmetic average of values obtained for the above 500 particles by measuring the length of the minor axis, that is the minor axis length, of the particles measured above, and calculating the value of the (major axis length/minor axis length) of each particle. The term "minor axis length" refers to, in the case of the particle size definition of (1), the length of the minor axis constituting the particle; in the case of (2), the thickness or height, and in the case of (3), since the major axis and minor axis cannot be distinguished, (major axis length/minor axis length) is deemed to be 1 for the sake of convenience.

When the particle has a specific shape, such as in the particle size definition of (1) above, the average particle size is the average major axis length. In the case of (2), the average particle size is the average plate diameter, with the average plate ratio being the arithmetic average of (maximum diameter/thickness or height). For the definition of (3), the average particle size is the average diameter (also called the average particle diameter).

A desirable specific example of the above ferromagnetic powder is hexagonal ferrite powder. From the perspectives of achieving higher density recording and stable magnetization, the size of hexagonal ferrite powder is desirably an average plate diameter ranging from 10 nm to 50 nm, preferably 20 nm to 50 nm. For details regarding hexagonal ferrite powder, reference can be made to Japanese Unexamined Patent Publication (KOKAI) No. 2011-216149, paragraphs 0134 to 0136.

A specific desirable example of the ferromagnetic powder is ferromagnetic metal powder. From the perspectives of achieving high-density recording and stable magnetization, the size of ferromagnetic metal powder is desirably an average major axis length ranging from 10 nm to 50 nm, preferably 20 nm to 50 nm. Reference can be made to Japanese Unexamined Patent Publication (KOKAI) No. 2011-216149, paragraphs 0137 to 0141, for example, for details regarding ferromagnetic metal powders.

The content (fill ratio) of ferromagnetic powder in the magnetic layer desirably falls within a range of 50 to 90 weight percent, preferably within a range of 60 to 90 weight percent. A high fill rate is desirable from the perspective of achieving higher recording densities.

(Solvent)

Examples of the solvent that is contained along with the above-described components in the above composition are the organic solvents that are commonly employed to manufacture particulate magnetic recording media. Specific examples, in any ratio, are acetone, methyl ethyl ketone, methyl isobutyl ketone, diisobutyl ketone, cyclohexanone, isophorone, tetrahydrofuran, and other ketones; methanol, ethanol, propanol, butanol, isobutyl alcohol, isopropyl alcohol, methyl cyclohexanol, and other alcohols; esters such as methyl acetate, butyl acetate, isobutyl acetate, isopropyl acetate, ethyl lactate, and glycol acetate; glycol dimethyl ether, glycol monoethyl ether, dioxane, and other glycol ethers; benzene, toluene, xylene, cresol, chlorobenzene, and other aromatic hydrocarbons; methylene chloride, ethylene chloride, carbontetrachloride, chloroform, ethylenechlorohydrin, dichlorobenzene, and other chlorinated hydrocarbons; and N,N-dimethyl formamide, hexane, and the like. Of these, the use of organic solvents containing ketones (ketone solvents) is desirable from the perspectives of the ability to dissolve the binders that are usually used in magnetic recording media and adsorption of the binder to the surface of the ferromagnetic powder. The ratio of the ketone solvent to the total quantity of solvent is desirably equal to or more than 60 weight percent, and can be 100 weight percent.

The organic solvent need not be 100% pure. It does not matter if isomers, unreacted material, by-products, decomposition products, oxides, moisture, and other impurities are contained in addition to the main components. These impurities desirably constitute equal to or less than 30 weight percent, preferably equal to or less than 10 weight percent. To enhance dispersion, somewhat strong polarity is desirable. In the solvent composition, equal to or more than 50 weight percent of solvent with a dielectric constant of equal to or higher than 15 is desirably contained. A solubility parameter of 8 to 11 is desirable. The quantity of solvent in the magnetic coating composition for magnetic recording media according to an aspect of the present invention is not specifically limited, and can be handled in the same manner as in the coating liquid for forming the magnetic layer in a common particulate magnetic recording medium.

The content of solvent in the above composition falls within a range of 100 to 800 weight parts, for example, and desirably falls within a range of 200 to 600 weight parts, per 100 weight parts of ferromagnetic powder.

(Other Components)

The above magnetic recording medium and composition can also optionally contain one or more known additives in addition to the components set forth above. Known additives can be added to the above composition and it can be used as a coating liquid for forming the magnetic layer. Examples of such additives are abrasives, lubricants, dispersants, dispersion adjuvants, fungicidal agents, electrostatic agents, oxidation inhibitors, carbon black, and the various additives that are commonly employed in forming particulate magnetic recording media. Additives can be suitably selected in the form of commercial products based on the properties desired.

The above composition can contain known curing agents. A magnetic layer that has been formed with a coating liquid for forming magnetic layers containing a curing agent will normally contain the crosslinked reaction product of binder and a curing agent. The use of a curing agent is desirable to increase the hardness of the magnetic layer. From the perspective of the crosslinking reactivity and the like, a curing agent in the form of polyisocyanate is desirable. Reference can be made to Japanese Unexamined Patent Publication (KOKAI) No. 2011-216149, paragraphs 0124 to 0125 for details regarding polyisocyanates. The curing agent can be added to the coating liquid for forming magnetic layers in a quantity of, for example, 0 to 80 weight parts, desirably 50 to 80 weight parts, per 100 weight parts of binder from the perspective of increasing the strength of the magnetic layer.

The above composition can be prepared by simultaneously admixing the various components set forth above, or by sequentially admixing them in any order. The method of preparing the composition is not specifically limited. Known techniques of preparing coating liquids for forming the magnetic layers of particulate magnetic recording media can be applied without restriction.

<Structure and Process of Manufacturing the Magnetic Recording Medium>

The structure and process of manufacturing the above magnetic recording medium are described in greater detail below.

(Magnetic Layer)

The magnetic layer can be formed by coating and drying the coating liquid for forming a magnetic layer directly on the surface of a nonmagnetic support, or on the surface of another layer such as a nonmagnetic layer that has been provided on the nonmagnetic support, and conducting treatments such as a heat treatment as needed. The various components contained in the magnetic layer and the composition that is used to form the magnetic layer are as set forth above.

(Nonmagnetic Layer)

Details of the nonmagnetic layer will be described next. In the magnetic recording medium, a nonmagnetic layer containing nonmagnetic powder and binder can be formed between the nonmagnetic support and the magnetic layer. Either inorganic substances or organic substances can be employed as the nonmagnetic powder in the nonmagnetic layer. Carbon black can also be employed. Examples of inorganic substances are metals, metal oxides, metal carbonates, metal sulfates, metal nitrides, metal carbides, and metal sulfides. These nonmagnetic powders are available as commercial products and can be manufactured by known methods. Reference can be made to Japanese Unexamined Patent Publication (KOKAI) No. 2011-216149, paragraphs 0146 to 0150, for details in this regard.

The binders, lubricants, dispersing agents, and other additives, solvents, dispersion methods, and the like of the magnetic layer can be applied to the nonmagnetic layer. In particular, techniques that are known with regard to the magnetic layer can be applied to the quantity and type of binder and the quantities and types of additives and dispersing agents that are added. It is also possible to add carbon black and organic powders to the nonmagnetic layer. In that regard, reference can be made to Japanese Unexamined Patent Publication (KOKAI) No. 2010-24113, paragraphs 0040 to 0042, for example.

(Nonmagnetic Support)

Examples of nonmagnetic supports are known supports such as biaxially stretched polyethylene terephthalate, polyethylene naphthalate, polyamide, polyamide-imide, and aromatic polyamide. Of these, polyethylene terephthalate, polyethylene naphthalate, and polyamide are desirable.

These supports can be subjected to corona discharge, plasma treatment, adhesion-enhancing treatment, and heat treatment in advance. The surface roughness of a nonmagnetic support that can be employed is desirably a center average roughness Ra of 3 nm to 10 nm at a cutoff value of 0.25 mm.

(Layer Structure)

With regard to the thickness of the nonmagnetic support and each layer in the magnetic recording medium, the thickness of the nonmagnetic support is desirably 3 μm to 80 μm. The thickness of the magnetic layer can be optimized for the magnetization saturation and head gap length of the magnetic head employed, the bandwidth of the recording signal, and the like, and is generally 10 nm to 150 nm, desirably 20 nm to 120 nm, preferably 30 nm to 100 nm. It suffices for the magnetic layer to be comprised of at least one layer, and it can be separated into two or more layers of differing magnetic characteristics. A structure relating to a known multilayer magnetic layer can be applied.

The thickness of the nonmagnetic layer is, for example, 0.1 μm to 3.0 μm, desirably 0.1 μm to 2.0 μm, and preferably 0.1 μm to 1.5 μm. The nonmagnetic layer in the present invention includes an essentially nonmagnetic layer containing trace quantities of ferromagnetic powder, for example, either as impurities or intentionally, in addition to the nonmagnetic powder. The essentially nonmagnetic layer means a layer exhibiting a residual magnetic flux density of equal to or less than 10 mT, a coercive force of equal to or less than 7.96 kA/m (100 Oe), or a residual magnetic flux density of equal to or less than 10 mT and a coercive force of equal to or less than 7.96 kA/m (100 Oe). The nonmagnetic desirably has no residual magnetic flux density or coercive force.

(Backcoat Layer)

In the magnetic recording medium of an aspect of the present invention, a backcoat layer can be provided on the opposite surface of the nonmagnetic support from the surface on which the magnetic layer is present. The backcoat layer desirably contains carbon black and inorganic powder. The formula of the magnetic layer or nonmagnetic layer can be applied to the binder and various additives for forming the backcoat layer. The backcoat layer is desirably equal to or less than 0.9 μm, preferably 0.1 to 0.7 μm in thickness.

Manufacturing Process

The process of manufacturing coating liquids for forming the magnetic layer, nonmagnetic layer, and backcoat layer normally comprises at least a kneading step, dispersing step, and a mixing step, provided as needed before and/or after these steps. Each of these steps can be divided into two or more stages. All of the starting materials employed in an aspect of the present invention, such as the ferromagnetic powder, the above compound, nonmagnetic powder, binder, carbon black, abrasives, antistatic agents, lubricants, and solvents can be added either at the start of, or part way through, any step. Any of the starting materials can be divided up and added in two or more steps. For example, polyurethane can be divided up and added in the kneading step, dispersing step, and in a kneading step after the dispersing step for viscosity adjustment. To manufacture the magnetic recording medium of an aspect of the present invention, conventionally known manufacturing techniques can be employed. An apparatus with powerful kneading strength such as an open kneader, continuous kneader, pressure kneader, extruder, or the like is desirably employed in the kneading step. These kneading treatments are described in Japanese Unexamined Patent Publication (KOKAI) Heisei Nos. 1-106338 and 1-79274, which are expressly incorporated herein by reference in their entirety. Glass beads or some other beads can be employed to disperse the magnetic layer coating liquid, nonmagnetic layer coating liquid, or backcoat layer coating liquid. Dispersion beads of high specific gravity in the form of zirconia beads, titanium beads, or steel balls are suitable as such dispersion beads. These dispersion beads can be employed by optimizing their particle diameters and fill rates. A known dispersing apparatus can be employed. Reference can be made to Japanese Unexamined Patent Publication (KOKAI) No. 2010-24113, paragraphs 0051 to 0057, for details on methods of manufacturing the magnetic recording medium. The crosslinking reaction of the curing agent can proceed in the heating during the drying step and the calendering treatment. As needed, a separate heat treatment can also be conducted from the drying step and calendering treatment, as described in Japanese Unexamined Patent Publication (KOKAI) No. 2012-74097, which is expressly incorporated herein by reference in its entirety, paragraph 0055.

The magnetic recording medium according to an aspect of the present invention set forth above achieves both improved dispersion of ferromagnetic powder and enhanced durability of magnetic layers. The magnetic coating composition for magnetic recording media according to an aspect of the present invention is suitable for use in forming such magnetic layers.

EXAMPLES

The present invention will be described more specifically below through Examples. However, the present invention is not limited to the forms disclosed in Examples. Unless specifically stated otherwise, the "parts" and "%" given below are based on weight.

The weight average molecular weight values given below were obtained by GPC measurement and polystyrene conversion. The number of repeated units was evaluated by $^1$H-NMR.

The target compounds obtained by the synthesis methods set forth below were confirmed by $^1$H-NMR, GPC, and acid value measurement.

Synthesis of Compound B-1

Synthesis of Polyester A-1

In a 500 mL three-necked flask were mixed 16.8 g of n-octanoic acid (Wako Pure Chemical Industries, Ltd.), 100 g of $\in$-caprolactone (Praxel M, made by Daicel Corp.), and 6.0 g of monobutytin oxide (made by Wako Pure Chemical Industries, Ltd.) (BuSn(O)OH) and the mixture was heated for 1 hour at 160° C. A 100 g quantity of $\in$-caprolactone was added dropwise over 5 hours and the mixture was stirred for another 2 hours. Subsequently, the mixture was cooled to room temperature to obtain polyester A-1.

Synthesis of Compound B-1

To 222.8 g of the polyester A-1 obtained were added 11.9 g of triglycidyl isocyanurate (Tokyo Chemical Industry Co., Ltd.) (mother nucleus compound) and 0.64 g of dimethyl-dodecylamine (catalyst) and the mixture was reacted for 6 hours at 90° C. to obtain compound B-1.

Synthesis of Polyester B-2

Synthesis of Polyester A-2

A 9.0 g quantity of 1-hexanol (alcohol: made by Tokyo Chemical), 200 g of $\in$-caprolactone (lactone compound), and 0.1 g of monobutyltin oxide were mixed, heated for 3 hours at 90° C., and heated for 8 hours at 110° C. The mixture was then cooled to room temperature to end the reaction, yielding polyester A-2.

Synthesis of Compound B-2

To a 209.1 g quantity of the polyester A-2 obtained were added 15.26 g of isocyanurate ring-containing polyisocyanate (Burnock D802 made by DIC, Inc.) (mother nucleus compound) and 1.38 g of dibutyltin dilaurate (catalyst: made by Wako Pure Chemical Industries). The mixture was reacted for 1 hour at 80° C. to obtain compound B-2.

[Compounds B-3 to B-7, B-10, and B-11]

With the exceptions that the polyesters and mother nucleus compounds and the quantities thereof that were charged were as indicated in Table 1 below, Compounds B-3 to B-7 and comparative compound A were synthesized in the same manner as in the synthesis of compound B-2.

With the exceptions that the quantities charged were as indicated in Table 1 below and the reaction of the polyester and mother nucleus compound was conducted for 3 hours at 110° C., B-10 and B-11 were synthesized in the same manner as in the synthesis of compound B-2.

[Comparative Compound A]

With the exceptions that the polyester and mother nucleus compounds and the quantities thereof that were charged were as indicated in Table 1 below, Comparative compound A was synthesized in the same manner as in the synthesis of compound B-2. Polyester A-6, which was used to synthesize comparative compound A, was synthesized by the following method.

Synthesis of Polyester A-6

In a 500 mL three-necked flask were mixed 4.2 g of n-octanoic acid (Wako Pure Chemical Industries, Ltd.), 100 g of $\in$-caprolactone (Praxel M, made by Daicel Corp.), and 0.74 g of monobutytin oxide (made by Wako Pure Chemical Industries, Ltd.) (BuSn(O)OH) and the mixture was heated for 1 hour at 160° C. A 100 g quantity of $\in$-caprolactone was added dropwise over 5 hours and the mixture was stirred for another 2 hours. Subsequently, the mixture was cooled to room temperature to obtain polyester A-6.

TABLE 1

| Compound | Polyester Polyester (no. of repeat units given in parantheses) | Mother nucleus compound Name of compound | Catalyst Type of catalyst | Amount charged (g) Polyester | Mother nucleus compound | Catalyst |
|---|---|---|---|---|---|---|
| B-1 | A-1 (15) | diglycidyl isocyanurate | dimethyldodecylamine | 222.8 | 11.9 | 0.64 |
| B-2 | A-2 (20) | isocyanurate ring-containing polyisocyanate (Bannock D802, DIC Corp.) | dibutyltin dilaurate | 209.1 | 15.26 | 1.38 |
| B-3 | A-3 (5) | isocyanurate ring-containing polyisocyanate (Bannock D802, DIC Corp.) | dibutyltin dilaurate | 265.3 | 61.03 | 5.53 |
| B-4 | A-4 (10) | isocyanurate ring-containing polyisocyanate (Bannock D802, DIC Corp.) | dibutyltin dilaurate | 226.2 | 34.79 | 3.15 |
| B-5 | A-5 (15) | isocyanurate ring-containing polyisocyanate (Bannock D802, DIC Corp.) | dibutyltin dilaurate | 228.4 | 20.34 | 1.84 |
| B-6 | A-3 (5) | isocyanurate ring-containing polyisocyanate (Bannock D802, DIC Corp.) | dibutyltin dilaurate | 268.4 | 91.55 | 5.53 |
| B-7 | A-5 (15) | isocyanurate ring-containing polyisocyanate (Bannock D802, DIC Corp.) | dibutyltin dilaurate | 217.1 | 61.03 | 1.84 |
| B-10 | A-1 (15) | melamine | dibutyltin dilaurate | 217.1 | 1.23 | none |
| B-11 | A-1 (15) | diaminopurine | dibutyltin dilaurate | 217.1 | 2.2 | none |
| Comparative compound A (used in Comparative Example 2) | A-6 (60) | triglycidyl isocyanurate | dimethyldodecylamine | 204.2 | 4.66 | 0.46 |

With the exceptions that the types and charge amounts of alcohols and lactone compounds indicated in Table 2 were employed, polyesters A-3 to A-5 were synthesized in the same manner as in the synthesis of polyester A-2.

TABLE 2

| Polyester | Alcohol | Qty. of alcohol charged (g) | Lactone compound | Qty. of lactone compound charged (g) |
|---|---|---|---|---|
| A-2 | 1-hexaonol | 9.0 | ε-caprolactone | 200 |
| A-3 | 1-dodecanol | 65.3 | ε-caprolactone | 200 |
| A-4 | 2-ethylhexanol | 6.5 | δ-valerolactone | 200 |
| A-5 | 2-hexyldecanol | 28.4 | ε-caprolactone | 200 |

Synthesis of Compound B-8

To 100 g of compound B-6 obtained above were added 1.3 g of glycolic acid (made by Tokyo Chemical) and the mixture was reacted for 1 hour at 80° C. to obtain compound B-8.

Synthesis of Compound B-9

To 100 g of compound B-7 obtained above were added 4.66 g of 3-(4-hydroxyphenyl)propionic acid (Tokyo Chemical) and the mixture was reacted for 1 hour at 80° C. to obtain compound B-9.

Synthesis of Comparative Compound B (Used in Comparative Example 3)

To 100 g of polyester A-1 were added 4.46 g of glycidyl neopentyl glycol diglycidyl ether (made by Tokyo Chemical), an aliphatic mother nucleus-containing bifunctional glycidyl compound, and 0.22 g of dimethyldodecylamine (catalyst). The mixture was reacted for 6 hours at 90° C. to obtain comparative compound B.

[Preparation of Magnetic Coating Composition for Magnetic Recording Media]
<Formula of Composition>
Ferromagnetic tabular hexagonal ferrite powder: 100 parts
  Composition excluding oxygen (molar ratio): Ba/Fe/Co/Zn=1/9/0.2/1
  Hc: 160 kA/m (2,000 Oe)
  Average plate diameter: 20 nm
  Average plate ratio: 2.7
  BET specific surface area: 60 m$^2$/g
  σs: 46 A·m$^2$/kg (46 emu/g)
Compound indicated in table 3: 10 parts
Polyurethane resin (Vylon (registered trademark) UR4800 made by Toyobo Co., Ltd., functional group: SO$_2$Na, functional group density:
70 eq/t, weight average molecular weight: 70,000): 4 parts
Vinyl chloride resin (MR104 made by Kaneka Corp, weight average molecular weight: 55,000): 10 parts
α-Al$_2$O$_3$ (average particle size: 0.1 μm): 8 parts
Carbon black (average particle size: 0.08 μm): 0.5 part
Cyclohexanone: 110 parts
<Preparation of Composition>

After kneading the various above components with an open kneader, they were dispersed with a sand mill. The components listed below were admixed to the dispersion obtained, the mixture was ultrasonically processed, and the mixture was filtered with a filter having a 1 μm average pore size to obtain a magnetic coating composition for magnetic recording media.
Butyl stearate: 1.5 parts
Stearic acid: 0.5 part
Stearamide: 0.2 part
Methyl ethyl ketone: 50 parts
Cyclohexanone: 50 parts
Toluene: 3 parts
Polyisocyanate compound (Coronate 3041, made by Nippon Polyurethane Industry Co., Ltd.): 2.5 parts
  [Evaluation of Dispersion Property]

A 0.5 mL quantity of the composition prepared above was collected and diluted 25-fold with a mixed solution of methyl ethyl ketone (MEK)/cyclohexanone=6/4 (volumetric ratio) to prepare a dispersion for evaluation. The transmittance at a wavelength of 450 nm of this dispersion was measured with a UV-3600 made by Shimadzu Corp. and the sample was evaluated according to the following scale. The lower the dispersion, the greater the aggregation or precipitation of the ferromagnetic powder in the solution and the higher the transmittance of the liquid (supernatant). Thus, the lower the transmittance, the better the dispersion was determined to be.
S: Transmittance of 1% or lower
A: Transmittance of more than 1% but less than 5.1%
B: Transmittance of 5.1% or more
  [Evaluation of Durability]
<Fabrication of Film for Evaluation of Durability>
  Compound listed in Table 3: 10 parts
  Polyurethane resin (Vylon (registered trademark) UR4800 made by Toyobo Corp.): 4 parts
  Vinyl chloride resin (MR104 made by Kaneka Corp.): 10 parts The above components were mixed. The mixture obtained was cooled to 10° C. or lower. Following cooling, 5.0 weight parts (solid fraction: 2.5 parts; toluene: 1.25 parts; methyl ethyl ketone (2-butanone): 1.25 parts) of a solution of polyisocyanate (Coronate 3041, made by Nippon Polyurethane Industry Co., Ltd.) were added, cyclohexanone was added, and the mixture was dissolved to a solid fraction of 22%.

The composition for film fabrication prepared by this method was applied with a doctor blade having a gap of 300 μm to a base film (Torelina (registered trademark) Film 3000 made by Toray Industries Co., Ltd.) and dried under vacuum for 30 minutes at 140° C. The dry film obtained was cooled to room temperature and then annealed for 2 days at 100° C. Following annealing, the film was cooled again to room temperature and separated from the base film, yielding a film for evaluating durability.
<Evaluation of Durability>
(Measurement of Rupture Energy)

The film obtained for evaluation of durability was cut to a width of 6.35 mm so as to achieve a chuck distance of 50 mm. The chuck distance was set to 50 mm in a strograph made by Toyobo Corp. (Toyoseiki Strograph V1-C), the cut film sample was positioned, and a film tensile test was conducted at a test rate of 50 mm/min. Elongation and stress were measured in the test.

The load (kgf) at time of rupture of the film was adopted as the weighting at rupture, a value calculated as the load at rupture obtained÷film cross-sectional area (μm$^2$)×9.8 was adopted as the stress at rupture (MPa), and the elongation at the time of rupture was adopted as the elongation at rupture.

The measured elongation was plotted on the horizontal axis and the stress on the vertical axis to obtain an elongation—stress curve. The points of intersection with the elongation at rupture and the stress at rupture were adopted as end points, and the integral of the region thus defined was taken as the rupture energy.

The greater the rupture energy, the greater the strength of the film and the better the durability indicated.

[Fabrication and Evaluation of Magnetic Tape]
<Fabrication of Nonmagnetic Layer Coating Liquid>
Nonmagnetic powder (αFe$_2$O$_3$ hematite): 80 parts
  Average major axis length: 0.15 μm
  BET specific surface area: 52 m$^2$/g
  pH: 6
  Tap density: 0.8
  DBP oil absorption capacity: 27 to 38 g/100 g
  Surface treatment agents: Al$_2$O$_3$, SiO$_2$
Carbon black: 20 parts
  Average particle size: 0.020 μm
  DBP oil absorption capacity: 80 mL/100 g
  pH: 8.0
  BET specific surface area: 250 m$^2$/g
  Volatile content: 1.5%
Polyurethane resin: 19 parts
  Branched side chain-comprising polyester polyol/diphenylmethane diisocanate
  —SO$_3$Na=100 eq/ton
Methyl ethyl ketone: 150 parts
Cyclohexanone: 150 parts The various components of the above coating material were kneaded with an open kneader and then dispersed with a sand mill. The components listed below were admixed to the dispersion obtained, after which the mixture was filtered with a filter having an average pore size of 1 μm to prepare a nonmagnetic layer coating liquid.
Butyl stearate: 1.5 parts
Stearic acid: 1 part
Methyl ethyl ketone: 50 parts
Cyclohexanone: 50 parts
Toluene: 3 parts Polyisocyanate compound (Coronate 3041 made by Nippon Polyurethane Industry Co., Ltd.): 5 parts <Preparation of Back Coat Layer Coating Liquid>
Carbon black (average particle size: 40 nm): 85 parts
Carbon black (average particle size: 100 nm): 3 parts
Nitrocellulose: 28 parts
Polyurethane resin: 58 parts
Copper phthalocyanine dispersing agent: 2.5 parts
Nipporan 2301 (made by Nippon Polyurethane Industry Co., Ltd.): 0.5 part
Methyl isobutyl ketone: 0.3 part
Methyl ethyl ketone: 860 parts
Toluene: 240 parts The above components were prekneaded with a roll mill and then dispersed with a sand mill. Four parts of polyester resin (Vylon 500, made by Toyobo Corp.), 14 parts of polyisocyanate compound (Coronate 3041, made by Nippon Polyurethane Industry Co., Ltd.), and 5 parts of α-Al$_2$O$_3$ (made by Sumitomo Chemical Co., Ltd.) were added and the mixture was stirred and filtered to prepare a back coat layer coating liquid.

<Fabrication of Magnetic Tape>
Simultaneous multilayer coating was conducted in which the above nonmagnetic layer coating liquid was coated on a polyethylene naphthalate resin support—which was 5 μm in thickness, had a centerline surface roughness of the magnetic layer coating surface of 0.001 μm, and had been corona treated in advance to render the base surface hydrophilic—in a manner calculated to yield a thickness upon drying of 1.0 μm, immediately after which the magnetic coating composition for magnetic recording media prepared above was coated thereover in a manner calculated to yield a magnetic layer with a thickness upon drying of 0.1 μm. In a stage when the two layers were still wet state, they were oriented with a cobalt magnet having a magnetic force of 0.5 T (5,000 G) and a solenoid having a magnetic force of 0.4 T (4,000 G) and dried. Subsequently, the above back coat layer coating liquid was coated on the base surface that had been subjected to the corona treatment in advance in a manner calculated to yield a thickness upon drying of 0.5 μm. Subsequently, the product was processed with a seven-stage calender comprised of metal rolls at a temperature of 100° C. at a rate of 80 m/min. The product was then slit to a width of 1/2 mm to fabricate a magnetic tape.

<Scratch Resistance Test>
The surface of the magnetic layer of the above magnetic tape was subjected to a scratch resistance test with an automated friction and abrasion analyzer (Triboster TS501: made by Kyowa Interface Science Co., Ltd.) in horizontal linear reciprocating sliding mode under conditions of a contact element: 3 mm φ, sphere load: 3 g, speed: 3 mm/s, measurement count: 10 times back and forth. The surface of the magnetic layer following the test was observed by optical microscopy (magnification: 100 to 500-fold) and scratch resistance was evaluated based on the following scale.

A: No scratches observed on the surface of the magnetic layer
B: Minute scratches observed on the surface of the magnetic layer
C: Deep scratches observed on the surface of the magnetic layer, with component scrapings being deposited on the surface of the magnetic layer.

The results of the above are given in Table 3.

TABLE 3

| | Compound added to magnetic layer | |
|---|---|---|
| | Type | Weight average molecular weight |
| Example 1 | Compound B-1 | 7,500 |

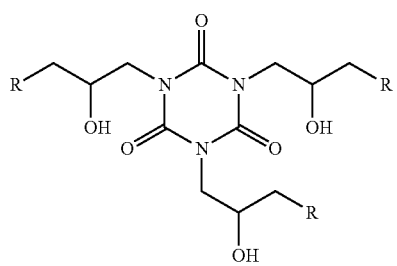

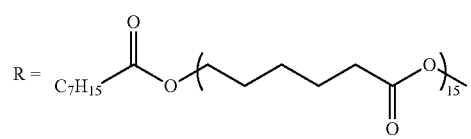

TABLE 3-continued
| Example 2 | Compound B-2 | 9,000 |
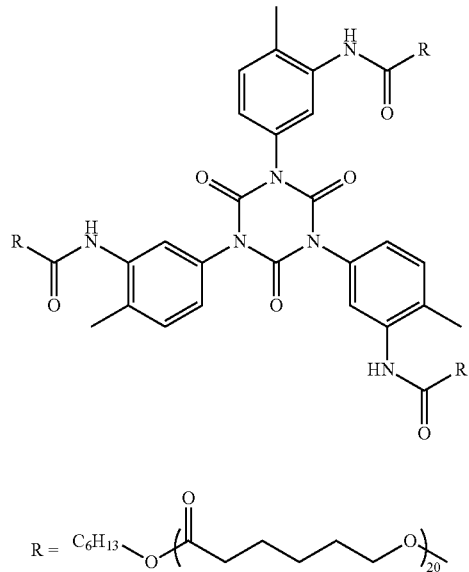
| Example 3 | Compound B-3 | 2,500 |
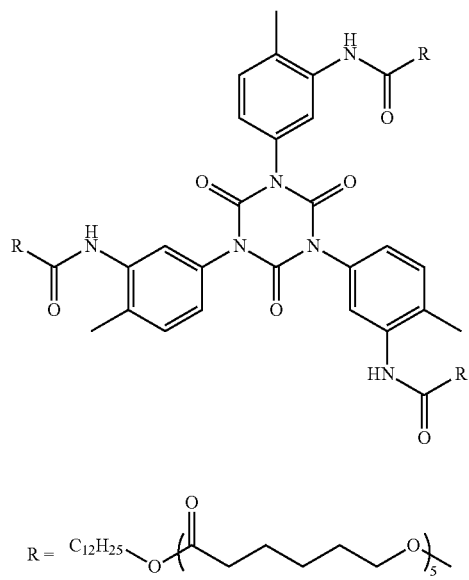

TABLE 3-continued
| Example 4 | Compound B-4 | 4,000 |
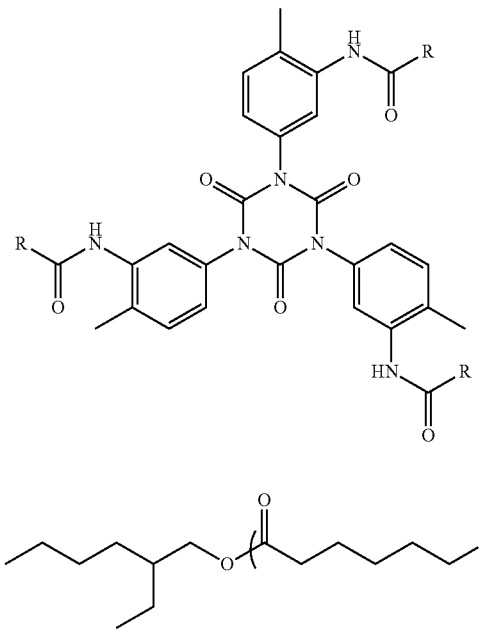
| Example 5 | Compound B-5 | 7,000 |
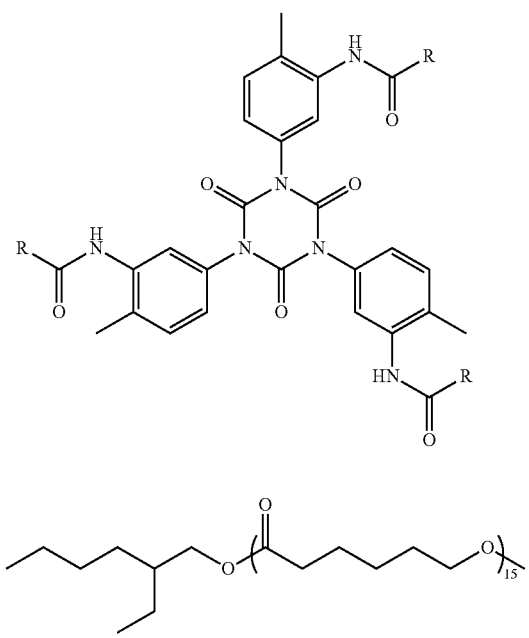

TABLE 3-continued
| Example 6 | Compound B-6 | 2,500 |
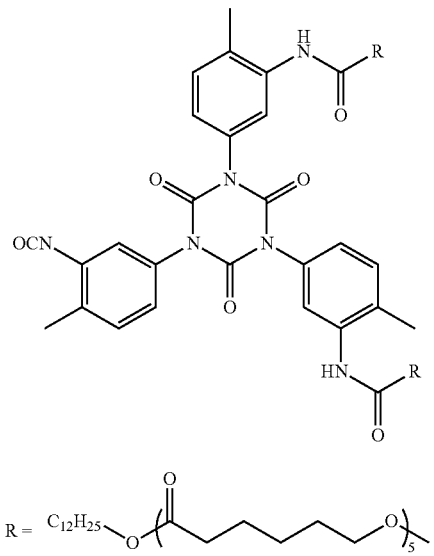
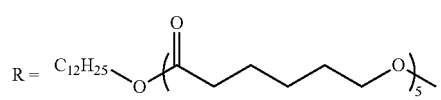
| Example 7 | Compound B-7 | 7,000 |
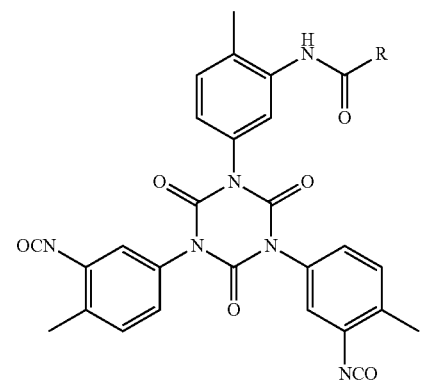
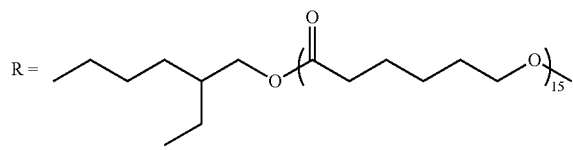
| Example 8 | Compound B-8 | 2,500 |
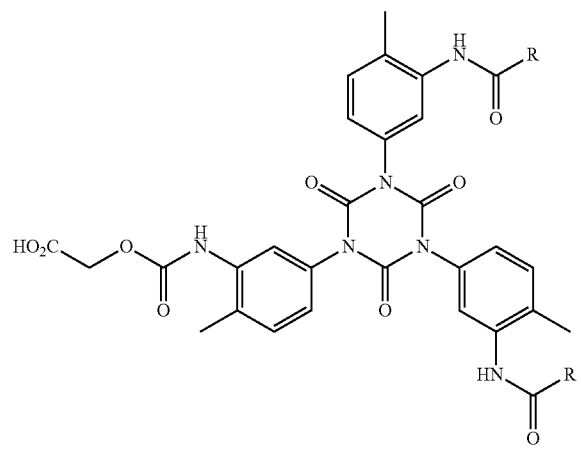

TABLE 3-continued

R = C₁₂H₂₅−O−(CO−(CH₂)₄−CH₂−O)₅

| Example 9 | Compound B-9 | 7,000 |

[Structure: triazine-based compound with three aryl substituents bearing carbamate, urea, and amide functionalities with HO₂C and CO₂H terminal groups]

R = C₇H₁₅−CO−(O−(CH₂)₅−CO)₁₅−O−

| Example 10 | Compound B-10 | 7,000 |

[Structure: 2,4,6-tris(methylamino)-1,3,5-triazine]

R = C₇H₁₅−CO−(O−(CH₂)₅−CO)₁₅−

| Example 11 | Compound B-11 | 7,000 |

[Structure: N,N'-dimethyl purine derivative]

R = C₇H₁₅−CO−(O−(CH₂)₅−CO)₁₅−

| Comparative Example 1 | none | |

TABLE 3-continued

| | | |
|---|---|---|
| Comparative Example 2 | Comparative Compound A 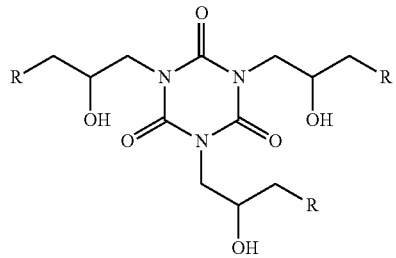 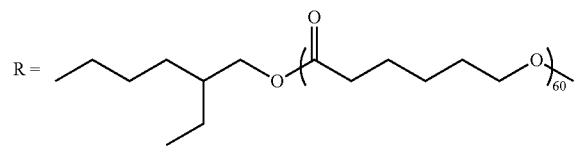 | 24,000 |
| Comparative Example 3 | Comparative compound B 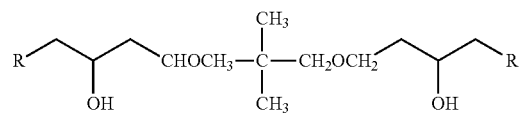 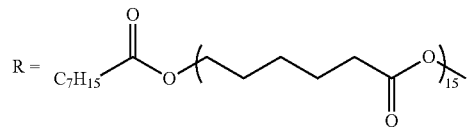 | 9,500 |

| | | Results of durability evaluation | | | |
|---|---|---|---|---|---|
| | Results of dispersion evaluation | Rupture energy | Stress at rupture (MPa) | Elongation at rupture (%) | Results of resistance to scratching evaluation |
| Example 1 | S (0.9) | 1850 | 25 | 120 | A |
| Example 2 | A (3) | 1850 | 30 | 120 | A |
| Example 3 | A (4) | 1700 | 22 | 110 | A |
| Example 4 | A (2) | 1800 | 22 | 130 | A |
| Example 5 | A (3) | 1900 | 26 | 130 | A |
| Example 6 | A (2) | 1600 | 28 | 110 | A |
| Example 7 | A (3) | 1700 | 30 | 110 | A |
| Example 8 | S (0.8) | 1600 | 28 | 110 | A |
| Example 9 | S (0.9) | 1700 | 30 | 110 | A |
| Example 10 | A (4) | 1900 | 28 | 120 | A |
| Example 11 | A (4) | 1900 | 28 | 120 | A |
| Comparative Example 1 | B (80) | 230 | 69 | 7 | C |
| Comparative Example 2 | B (60) | 1400 | 25 | 120 | A |
| Comparative Example 3 | B (50) | 1200 | 25 | 70 | B |

As shown in Table 3, the compound denoted by formula (1), which had a weight average molecular weight falling within a range of not less than 1,000 but less than 20,000, enhanced the dispersion of ferromagnetic powder. Further, the magnetic tapes of the Examples having magnetic layers containing this compound exhibited good scratch resistance. Based on the values of the rupture energy, stress at rupture, and elongation at rupture given in Table 3, the Examples were determined to exhibit ready elongation (elongation at rupture) that was much improved over that of the comparative examples. Thus, the above compounds were thought to play the roles of plasticizers in contributing to enhanced durability (scratch resistance) of the magnetic layer.

Based on the above results, the present invention was determined to make it possible to achieve both improved dispersion of ferromagnetic powder and increased durability of the magnetic layer.

An aspect of the present invention is useful in the field of manufacturing magnetic recording media for high-density recording, such as high-capacity backup tapes.

The present invention is useful in the field of manufacturing magnetic recording media for high density recording, such as in high-capacity backup tapes.

Although the present invention has been described in considerable detail with regard to certain versions thereof, other versions are possible, and alterations, permutations and equivalents of the version shown will become apparent to those skilled in the art upon a reading of the specification and study of the drawings. Also, the various features of the versions herein can be combined in various ways to provide additional versions of the present invention. Furthermore, certain terminology has been used for the purposes of descriptive clarity, and not to limit the present invention. Therefore, any appended claims should not be limited to the description of the preferred versions contained herein and should include all such alterations, permutations, and equivalents as fall within the true spirit and scope of the present invention.

Having now fully described this invention, it will be understood to those of ordinary skill in the art that the methods of the present invention can be carried out with a wide and equivalent range of conditions, formulations, and other parameters without departing from the scope of the invention or any Examples thereof.

All patents and publications cited herein are hereby fully incorporated by reference in their entirety. The citation of any publication is for its disclosure prior to the filing date and should not be construed as an admission that such publication is prior art or that the present invention is not entitled to antedate such publication by virtue of prior invention.

What is claimed is:

1. A magnetic recording medium, which comprises a magnetic layer comprising ferromagnetic powder and binder on a nonmagnetic support, wherein
the magnetic layer further comprises a compound which has a weight average molecular weight of equal to or more than 1,000 but less than 20,000 and which is selected from the following Compounds B-8 and B-9:

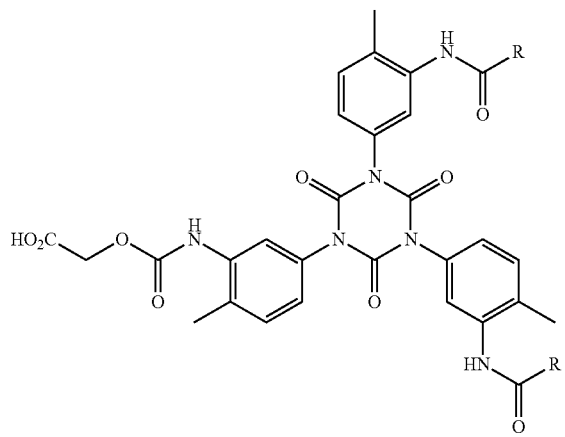

Compound B-8

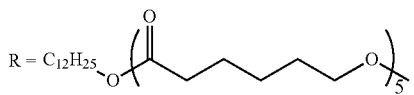

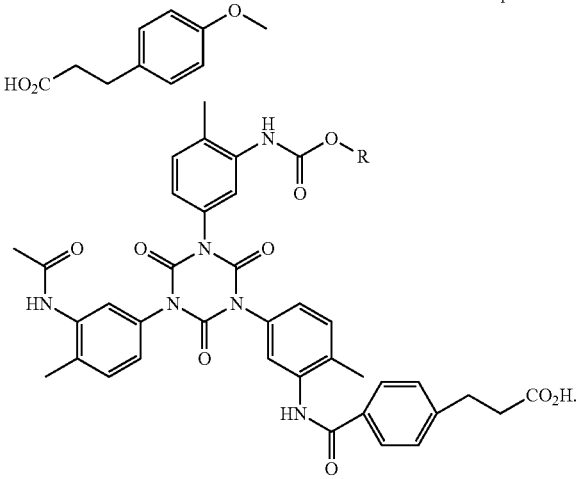

Compound B-9

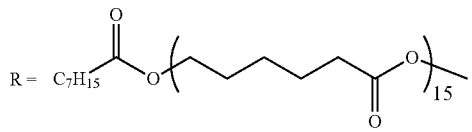

2. The magnetic recording medium according to claim 1, wherein the binder has a weight average molecular ranging from 20,000 to 120,000.

3. The magnetic recording medium according to claim 1, wherein the ferromagnetic powder has an average particle size ranging from 10 nm to 50 nm.

4. The magnetic recording medium according to claim 1, wherein the magnetic layer comprises the compound B-8 or B-9 in a quantity ranging from 0.5 to 50 weight parts per 100 weight parts of the ferromagnetic powder.

5. The magnetic recording medium according to claim 1, wherein the binder is selected from the group consisting of polyurethane resin and vinyl chloride resin.

6. A magnetic coating composition, which is a magnetic coating composition for a magnetic recording medium and comprises:

ferromagnetic powder;
binder;
solvent; and
a compound which has a weight average molecular weight of equal to or more than 1,000 but less than 20,000 and which is
selected from the following Compounds B-8 and B-9:

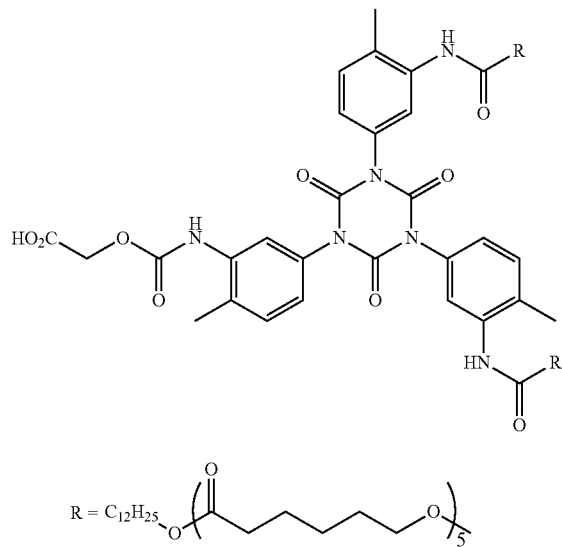

Compound B-8

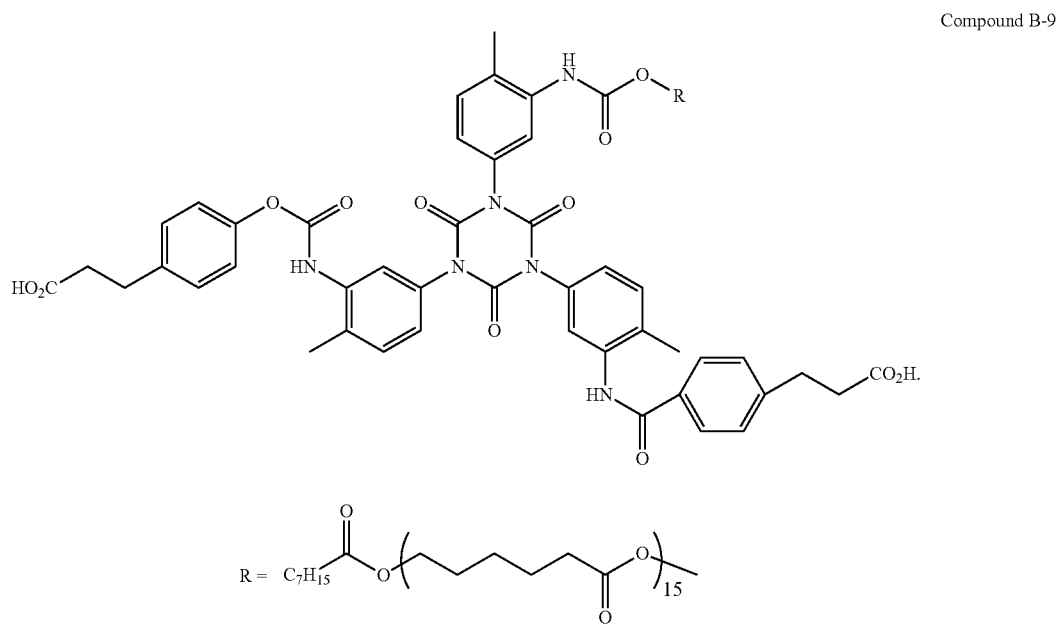

Compound B-9 or B-9 in a quantity ranging from 0.5 to 50 weight parts per 100 weight parts of the ferromagnetic powder.

10. The magnetic coating composition according to claim 6, wherein the binder is selected from the group consisting of polyurethane resin and vinyl chloride resin.

11. The magnetic coating composition according to claim 6, wherein the solvent is ketone solvent.

7. The magnetic coating composition according to claim 6, wherein the binder has a weight average molecular ranging from 20,000 to 120,000.

8. The magnetic coating composition according to claim 6, wherein the ferromagnetic powder has an average particle size ranging from 10 nm to 50 nm.

9. The magnetic coating composition according to claim 6, wherein the magnetic layer comprises the compound B 8

12. A magnetic recording medium, which comprises a magnetic layer comprising ferromagnetic powder and binder on a nonmagnetic support, wherein the magnetic layer further comprises a compound which has a weight average molecular weight of equal to or more than 1,000 but less than 20,000 and which is the following Compound B-1:
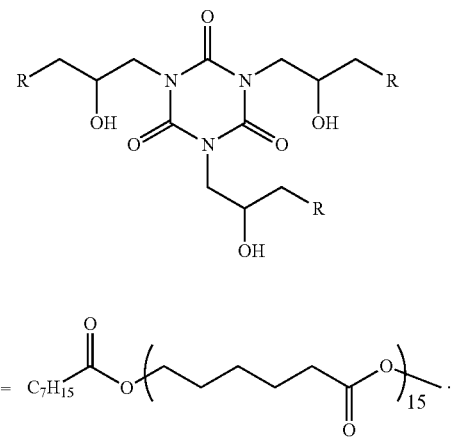
Compound B-1
13. A magnetic coating composition, which is a magnetic coating composition for a magnetic recording medium and comprises:
   ferromagnetic powder;
   binder;
   solvent; and
   a compound which has a weight average molecular weight of equal to or more than 1,000 but less than 20,000 and which is
   the following compound B-1:
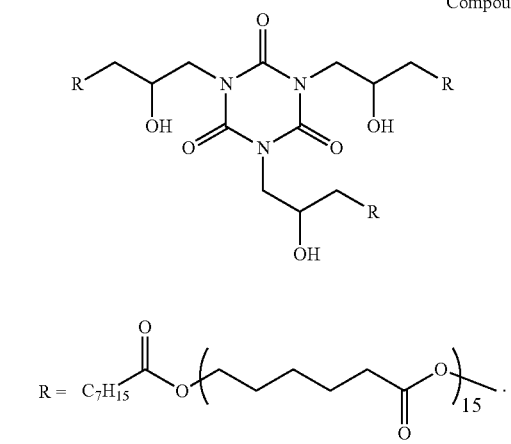
Compound B-1
* * * * *